Nov. 4, 1958
S. LARACH
2,859,367
ELECTROLUMINESCENT DEVICES AND MATERIALS
AND METHODS OF PREPARATION THEREOF
Filed Aug. 23, 1955
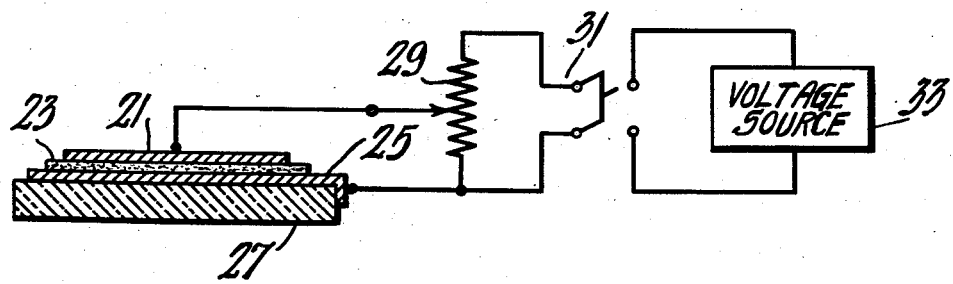
INVENTOR.
Simon Larach
BY
ATTORNEY

United States Patent Office 2,859,367
Patented Nov. 4, 1958

2,859,367

ELECTROLUMINESCENT DEVICES AND MATERIALS AND METHODS OF PREPARATION THEREOF

Simon Larach, Princeton, N. J., assignor to Radio Corporation of America, a corporation of Delaware Application August 23, 1955, Serial No. 530,159

10 Claims. (Cl. 313—108)

This invention relates to electroluminescent materials, and particularly, but not necessarily exclusively, to improved red-emitting electroluminescent phosphors, to improved methods of preparation thereof and to improved devices including the phosphors of the invention.

Electroluminescence is the term applied to the light emission obtained when an electric field is applied across a layer of electroluminescent phosphor particles, which particles are usually embedded or suspended in a dielectric medium. Although electroluminescent phosphors with a variety of emission colors have been described, an efficient red-emitting electroluminescent phosphor has been lacking. Phosphors which exhibit a red light emission under ultra violet or cathode ray excitation are, generally, non-luminescent when excited with an electric field. For example, cathodoluminescent copper-activated zinc selenide is an efficient red-emitter under cathode ray excitation but is substantially non-luminescent under electric field excitation.

An object of the invention is to provide improved electroluminescent phosphors and improved methods of preparation thereof.

Another object is to provide improved phosphors which emit red light under electric field excitation, which phosphors are highly resistant to burn and which are readily reproducible.

A further object is to provide electroluminescent copper-activated zinc selenide and zinc-cadmium selenide phosphors and improved methods of preparation thereof.

Another object is to provide improved devices incorporating the electroluminescent phosphors of the invention.

The foregoing objects and other advantages may be accomplished in accordance with the invention which includes preparing a phosphor by a method which comprises reacting an intimate mixture including 100 to 90 mole percent of zinc selenide, 0 to 10 mole percent of cadmium selenide and about 0.01 to 0.5 weight percent of copper as a salt at a temperature between 800° C. and 1200° C. in the presence of bromine. Bromine may be present as a bromide salt in said mixture or may be present in the firing atmosphere as free elemental bromine or gaseous bromine compounds. Bromine is present preferably both in said mixture and in the firing atmosphere.

The invention includes also the improved electroluminescent phosphors prepared by the improved methods of the invention and devices including the improved phosphors of the invention.

The invention is described in greater detail by reference to the accompaying drawing in which the sole figure is a partially-sectional, partially schematic view of a device including the electroluminescent phosphors of the invention.

*Example 1.*—To 100 grams of pure zinc selenide, add 0.1 gram of copper as an aqueous solution of copper bromide. This mixture is slurried with triple distilled water and dried at 150° C. The dried material is placed in a firing container such as a silica dish and then placed in a cool transparent furnace tube such as quartz glass. The air is flushed out of the tube with a gaseous mixture produced by passing 200 milliliters per minute of nitrogen over liquid bromine at room temperature. The flushing is continued until, after about 2 minutes, the surface of the mix turns to a reddish-brown in color. The flow of nitrogen over the liquid bromine is reduced to about 20 milliliters per minute and the resultant mixture is passed through the furnace tube. The furnace tube is inserted into a furnace maintained at about 900° C. and allowed to remain there for about 30 minutes. The furnace tube is removed from the furnace and allowed to cool with the nitrogen-bromine mixture still flowing. After cooling, the nitrogen-bromine flow is stopped and the reaction product removed from the furnace tube.

The phosphor prepared in Example 1 has the approximate formula ZnSe:Cu(0.1) as calculated from the raw batch. The number in the parenthesis represents weight percent of copper. This phosphor is light yellow in color, very soft and has a very small particle size. The color of the electroluminescence emission is orange-red. The material of Example 1, when subject to a sufficient electric field, emits light by electroluminescence but "burns" rapidly. By "burn" is meant the decrease in electroluminescence emission intensity due to the effects of the applied electric field. It is desirable therefore to provide a method of increasing the ability of the phosphor to resist burn.

*Example 2.*—To 100 grams of pure zinc selenide, add 0.10 gram of copper as an aqueous solution of copper bromide and 2.0 grams of ammonium bromide. This mixture is slurried, dried and fired as in Example 1. The product is almost identical with the product of Example 1 except that the material is substantially free of "burn" and exhibits a greater electroluminescence emission intensity.

The copper added in minor amounts serves as an activator in the host crystal of the phosphor. It has been established that the incorporation of as little as 0.01 percent by weight and as much as 0.50 percent by weight copper produces usable electroluminescent phosphors. Referring to Table I, there is shown the relative electroluminesence emission intensity of phosphors prepared according to Example 2 wherein the proportion of copper was varied between 0.01 and 0.20 weight percent. The optimum amount appears to be approximately 0.1 weight percent. The copper may be incorporated by any convenient method known in the phosphor art. It is convenient to add the copper as a soluble salt of copper, preferably copper bromide. Other copper salts that may be used are copper chloride, copper acetate, copper oxalate and copper nitrate.

*Table I*

| Cu (weight-percent) | Electroluminescence Emission Intensity |
|---|---|
| 0.01 | 0.02 |
| .03 | 4 |
| .06 | 160 |
| .08 | 360 |
| .10 | 500 |
| .15 | 770 |
| .20 | 230 |

The phosphors of the invention are described with respect to zinc selenide. Cadmium may be substituted for zinc in proportions up to 10 mole percent. Such substitution may be accomplished for example, by substituting cadmium selenide in proportions up to 10 mole percent for zinc selenide in Example 2. Referring to Table II, the effect of substituting cadmium and zinc is to shift the color of electroluminescence emission toward the longer wavelengths of the spectrum.

*Table II*

| Phosphor Composition | Electroluminescence Emission Color |
| --- | --- |
| ZnSe:Cu(0.1) | orange-red. |
| 0.97ZnSe:0.03CdSe:Cu(0.1) | red. |
| 0.95ZnSe:0.05CdSe:Cu(0.1) | deep red. |

The use of bromine is an important part of the process of the invention and must be present either in the firing atmosphere or as a flux or preferably both. In Example 1, the bromine is introduced in the firing atmosphere only and in Example 2 the bromine is introduced both in the firing atmosphere and as a flux. In both cases, the nitrogen serves as a carrier and as a diluent for the bromine. Any inert gas, for example, argon, neon or helium may be used in place of nitrogen. The rate of flow of nitrogen over the bromine and the flow of the bromine-nitrogen mixture over the mix during firing is not critical. Similarly the proportion of nitrogen to bromine may be varied over a very wide range. Besides bromine, volatile bromides such as hydrogen bromide and methyl bromide may be used in the firing atmosphere.

In Example 2, the bromine is also introduced as an ammonium bromide flux. Although ammonium bromide is used bromides of the alkali metals, the alkaline earth metals and the volatile cations may be used. Ammonium bromide is preferred because excess amounts volatilize easily and because the components do not adversely effect the electroluminescence of the phosphors. Examples of other bromides that may be used are sodium bromide, potassium bromide, calcium bromide and magnesium bromide.

The phosphors of the invention may also be prepared according to Example 2 with an inert atmosphere free of bromine and bromides. In such case, the proportion of flux should be increased in order to obtain the optimum results. Where the phosphor is prepared in a bromine-containing atmosphere as in Example 2, the proportion of flux is preferably between 0.1 and 3.0 weight percent. The optimum is about 2.0 weight percent. Where an inert atmosphere free of bromine and bromides is used, the proportion of flux is preferably between 5.0 and 15.0 weight percent. The optimum is about 10.0 weight percent.

The preferred firing time has been found to be about 30 minutes although it may be varied widely. A preferred range of firing times is about 20 to 40 minutes. The firing time depends in part on the size of the batch, the packing density of the mix and the cross-sectional area of the batch. Since firing is carried out in order to diffuse the copper-activator and to crystallize the host crystal material, the firing time is not critical so long as there is sufficient time to accomplish these purposes.

While satisfactory electroluminescent phosphors are prepared by firing the batch between 800° C. and 1200° C., the optimum temperature is about 900° C. Referring to Table III there is shown the effect of various firing temperatures upon the electroluminescence emission intensity of phosphors prepared according to Example 2.

*Table III*

| Crystallization Temperature, °C. | Electroluminescence Emission Intensity |
| --- | --- |
| 800 | ~0 |
| 900 | 52 |
| 1,000 | 36 |
| 1,100 | 48 |
| 1,200 | 1.2 |

The electroluminescent phosphors described in the foregoing section were tested by depositing a slurry comprising a finely-powered electroluminescent phosphor suspended in a dielectric medium such as castor oil between a pair of closely-spaced, transparent, electrically-conducting electrodes. The material emits light when a voltage is applied across the electrodes. For the purpose of testing, a 10 kilocycle alternating voltage of 800 volts peak to peak was used, and an electrode spacing of about 0.002 inch.

While the above-described cell is satisfactory for testing purposes a more permanent cell is illustrated in the sole figure. The illustrated cell comprises a transparent base 27 such as a sheet of glass, a transparent, electrically-conducting layer 25 thereon such as may be obtained by treating heated glass with tin chloride vapor, a layer 23 thereon comprising finely-divided electroluminescent phosphor particles of the invention dispersed in a solid or semi-solid dielectric medium or reasonable light-transmitting properties, such as wax, resin or plastic, and a metallic coating 21 thereon such as aluminum. The metallic coating 21 and the transparent electrically-conducting coating 25 are connected to an alternating current voltage source 23 through a switch 31 and a potentiometer 29. Upon applying a voltage, light may be observed through the transparent base 27. Generally, the higher the intensity of the electric field across the electroluminescent layer 23, the greater the light emission intensity.

There have been described improved electroluminescent phosphors, improved methods of preparation thereof and improved electroluminescent devices including the phosphors of the invention. The phosphors of the invention are efficient red-emitters under electric field excitation, many of which are highly resistant to burn and readily reproducible by the methods of the invention.

What is claimed is:

1. A method for preparing a phosphor comprising reacting an intimate mixture consisting essentially of 100 to 90 mol percent of zinc selenide, up to 10 mol percent of cadmium selenide and about 0.01 to 0.50 weight percent of copper as a salt at a temperature between 800° C. and 1200° C. in an inert atmosphere in contact with bromine, said bromine being present as at least one member of the group consisting of elemental bromine, volatile bromides, alkali metal bromides, alkaline earth metal bromides, and bromides of volatile cations.

2. A method according to claim 1 wherein said bromine is present in the firing atmosphere as free elemental bromine.

3. A method according to claim 1 wherein said bromine is present in the mixture as 5 to 15 weight percent of a bromide selected from the group consisting of bromides of the alkali metals, alkaline earth metals and volatile cations.

4. A method according to claim 1 wherein said bromine is present as free elemental bromine in the firing atmosphere and also present in the mixture as 0.1 to 3.0 weight percent of a bromide selected from the group consisting of bromides of the alkali metals, alkaline earth metals and volatile cations.

5. A method for preparing a phosphor comprising reacting an intimate mixture consisting essentially of zinc selenide, about 0.01 to 0.50 weight percent of copper as a salt and about 10 weight percent of ammonium bromide at a temperature of about 900° C. in an inert atmosphere.

6. A method for preparing a phosphor comprising reacting an intimate mixture consisting essentially of zinc selenide, about 0.01 to 0.50 weight percent of copper as a salt, about 2 weight percent of ammonium bromide at a temperature of about 900° C. in an inert atmosphere containing free elemental bromine.

7. A phosphor consisting essentially of the reaction product formed by the method of claim 1.

8. A phosphor consisting essentially of the reaction product formed by the method of claim 3.

9. A phosphor consisting essentially of the reaction product formed by the method of claim 4.

10. A device comprising a layer of finely-divided electroluminescent phosphor particles consisting essentially of the reaction product formed by the method of claim 1, means for applying an electric field to said layer, and light-transmissive means adjacent one side of said layer for transmitting electroluminescence emission from said layer to a region outside said device.

References Cited in the file of this patent

UNITED STATES PATENTS

| | | |
|---|---|---|
| 2,660,566 | Froelich | Nov. 24, 1953 |
| 2,698,915 | Piper | Jan. 14, 1955 |